United States Patent [19]

Sakakibara

[11] Patent Number: 5,049,923
[45] Date of Patent: Sep. 17, 1991

[54] MICROFILM READER/PRINTER

[75] Inventor: Katsunori Sakakibara, Osaka, Japan

[73] Assignee: Minolta Camera Kabushiki Kaisha, Osaka, Japan

[21] Appl. No.: 542,268

[22] Filed: Jun. 22, 1990

[30] Foreign Application Priority Data

Jun. 23, 1989 [JP] Japan ................................ 1-161672
Sep. 14, 1989 [JP] Japan ................................ 1-236893

[51] Int. Cl.$^5$ ...................... G03B 13/26; G03B 13/28
[52] U.S. Cl. ........................................ 355/45; 355/56
[58] Field of Search .................................. 355/43–45, 355/55, 56, 271

[56] References Cited

U.S. PATENT DOCUMENTS

| 4,440,487 | 4/1984 | Miura ................................ 355/235 |
| 4,669,858 | 6/1987 | Ito et al. ............................ 355/55 |
| 4,708,463 | 11/1987 | Kondoh et al. ..................... 355/45 |

FOREIGN PATENT DOCUMENTS 63-18985  2/1987  Japan .

Primary Examiner—L. T. Hix
Assistant Examiner—D. Rutledge
Attorney, Agent, or Firm—Price, Gess & Ubell

[57] ABSTRACT

Disclosed is a microfilm reader/printer which projects a microfilm image onto a screen and which makes a copy in an enlarged or reduced state of the image suitable to a selected copying paper size. On the screen there are provided marks which indicate image ranges in printing with respect to both vertically long and laterally long images, and a projective magnification of a lens is adjusted so that the profile of the image projected on the screen conforms to the marks. In copying, a change is made automatically to a new projective magnification calculated in conformity with a selected copying paper size, and a copy is obtained at the new projective magnification. When a longitudinal direction of the image projected on the screen and that of copying paper are not coincident with each other, both can be rendered coincident with each other by rotating an image rotating prism disposed in a projective optical system. When the image rotating prism rotates, in order to prevent partial image loss caused by off-center rotation of the same prism, a change is made automatically to a projective magnification obtained by multiplying the projective magnification of the lens which has been calculated according to the selected copying paper size by a predetermined reduction rate, and the copy is made at the automatically-changed projective magnification.

29 Claims, 12 Drawing Sheets

MICROFILM READER/PRINTER

BACKGROUND OF THE INVENTION

1. Field of the Invention

The present invention relates to a microfilm reader/printer for projecting a microfilm image onto a screen and printing the image.

2. Description of the Related Arts

An original image recorded on a microfilm or a microfische is recorded as a vertically long image if the original is vertically long, or recorded as a laterally long image if the original is laterally long. If an image recorded on a microfilm or the like is to be merely seen in a projected form on a screen, it may be projected as it is on the screen. But when it is to be printed, it is necessary to adjust the image position for printing the image in an appropriate position on a copying paper.

To this end, on the screen there are indicated marks (hereinafter referred to as "frame marks") for determining the position of the image to be projected onto the screen for both vertically long and laterall long images. By adjusting the position of an image to be projected so that the profile of the image comes into registration with such frame marks, it is possible to print the image in a predetermined position on the copying paper.

In order to reduce the size of a printing mechanism, many microfilm reader/printers adopt a structure in which each copying paper is fed in a lateral direction, i.e., along the short sides of the copying papers and in the case of a vertically long image, the image is projected to an image forming portion without rotation of the image, while in the case of a laterally long image, the image is rotated by 90° and projected to the image forming portion.

In this case, there is used an image rotating prism for turning the direction of the image projected by a projection lens, but it is difficult to obtain exact coincidence between the optical axis of the projection lens and the center of rotation of the image rotating prism, and usually there occurs a slight deviation. Consequently, the center of the projected image which has been rotated by the image rotating prism is deviated longitudinally and transversely from the center of a projected image which has not been rotated. This phenomenon is called "off-center rotation".

Thus, when an image is rotated using an image rotating prism and projected to an image forming portion, the image formed on the image forming portion is deviated longitudinally and transversely, so there arises a fear of the image being partially broken off. According to a method for preventing such partial image loss, out of the frame marks on the screen, the frame marks on the side where the image is rotated by 90° at the time of printing, which frame marks correspond to the laterally long image in the foregoing example, are made smaller in size by several percents than the frame marks on the side where the image is not rotated, corresponding to the vertically long image in the foregoing example, to prevent the partial image loss even when the position of the image projected on a photosensitive drum is deviated by the off-center rotation. According to another method proposed for such purpose, the size of the frame marks for a vertically long image and that of the frame marks for a laterally long image are made equal to each other and both are set rather small to prevent the partial image loss irrespectively of whether or not the image is rotated.

Recently, a microfilm reader/printer having a zoom lens incorporated therein as the projection lens has come to be more and more popular. In this case, however, when out of frame marks provided on a screen, the size of the frame marks on the side where an image is rotated by 90° at the time of printing is set smaller than the size of the frame marks on the side where the image is not rotated, it is necessary for the operator to operate the zoom lens to change the projection size and make registration of the image projected on the screen with the frame marks at every change from a vertically long image to a laterally long image on the film and at every change reverse thereto. In the case where the same frame marks are used for both vertically long and laterally long images and the size thereof is set small so as not to cause the partial image loss, it is not necessary to perform the aforesaid operation of the zoom lens, but the resulting print always involves an unnecessarily large marginal portion around the image. Since this marginal portion usually appears as a black frame, the print itself becomes very unsightly.

In conventional microfilm reader/printers, a turn-back mirror is inserted in part of a projective optical system for projecting an image onto a screen, whereby a projective image on a film is projected to a printer portion to effect printing. More specifically, a reader optical system for projection onto the screen and a printer optical system for printing have a lighting device and a projection lens in common to each other, and a turn-back mirror is inserted in the optical path portion after the projection lens to make change-over between the reader optical system and the printer optical system. As a result, the magnification of the image on the screen and that of the image to be printed out become equal to each other.

Therefore, when it is intended to obtain an enlarged image conforming to a desired size of copying paper out of various sizes of copying papers, it is necessary to adjust the projection size of the projection lens in conformity with the frame mark indicating the desired size of copying paper, but this operation is complicated. And, in effect, it has been impossible to make printing on a copying paper larger than the screen. In a certain microfilm reader/printer considering how to cope with this problem, the projection size in printing is set larger than that on a screen. More particularly, the optical path of a printer optical system is set longer than that of a reader optical system, and in addition to a turn-back mirror, a converter lens is provided removably in the optical path portion after a projection lens to thereby change a focal length (projection size). In this apparatus, the magnification ratio between the image on the screen and the image to be printed out is determined by the inserted converter lens. Therefore, for printing images on printing papers of various sizes, it is necessary to provide converter lenses for the various sizes. Further, even when converter lenses are changed from one to another according to the required size, it is necessary to make focusing at every such replacement.

SUMMARY OF THE INVENTION

It is a primary object of the present invention to provide a novel microfilm reader/printer capable of projecting a microfilm image onto a screen and printing the image at a magnification corresponding to the size of a selected recording medium.

It is another object of the present invention to provide a novel microfilm reader/printer capable of rotating a projected image when the longitudinal direction of the image and that of a recording medium are not coincident with each other, and also capable of adjusting the projection size to prevent partial image loss and then printing the image.

It is a further object of the present invention to provide a novel microfilm reader/printer capable of setting a projection size different from that in screen projection according to the size of a selected recording medium and then printing a microfilm image at the projection size.

Other objects of the present invention will become apparent from the following description taken in connection with the accompanying drawings and claims.

DETAILED DESCRIPTION OF THE PREFERRED EMBODIMENTS

Embodiments of the present invention will be described hereinunder with reference to the accompanying drawings.

Figure 1:
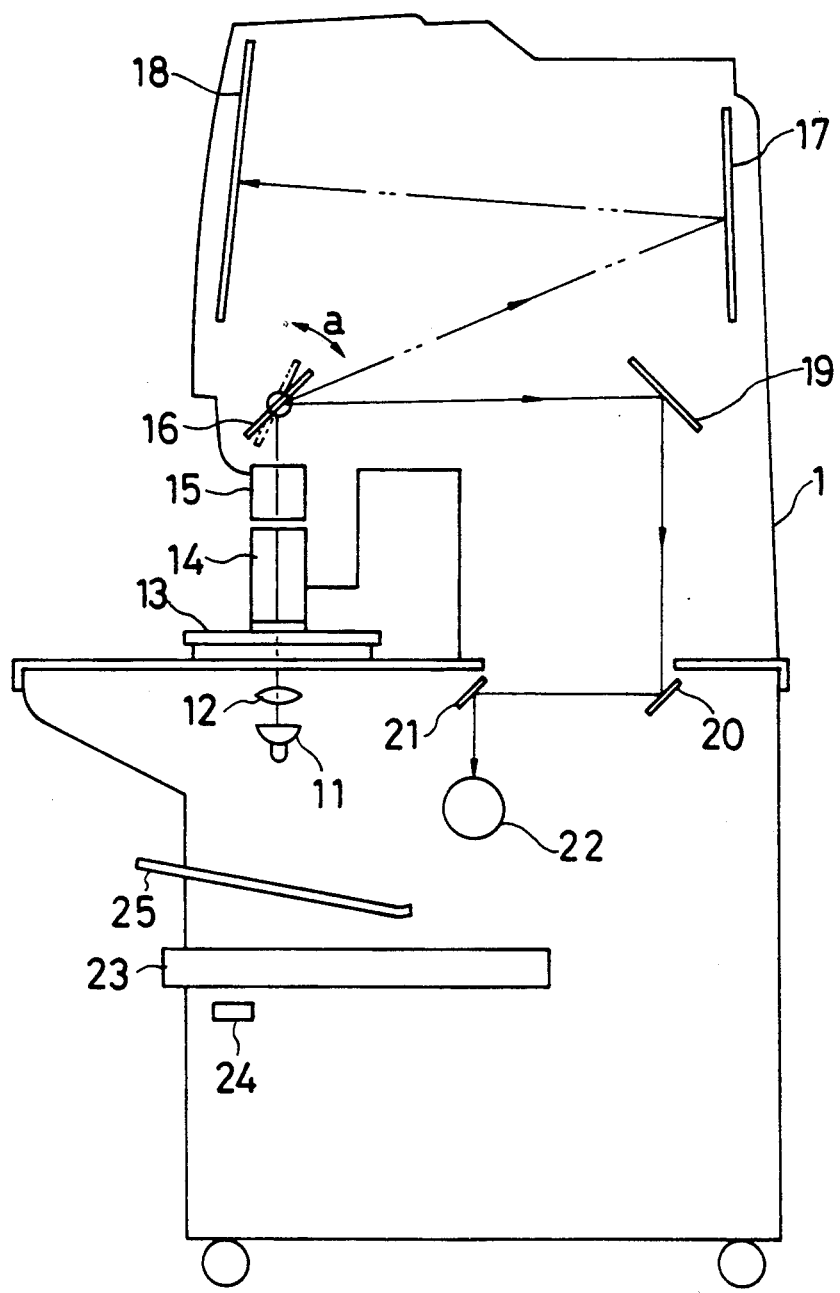
FIG. 1 is a sectional side view of a microfilm reader/printer to which was applied the present invention.
Figure 2:
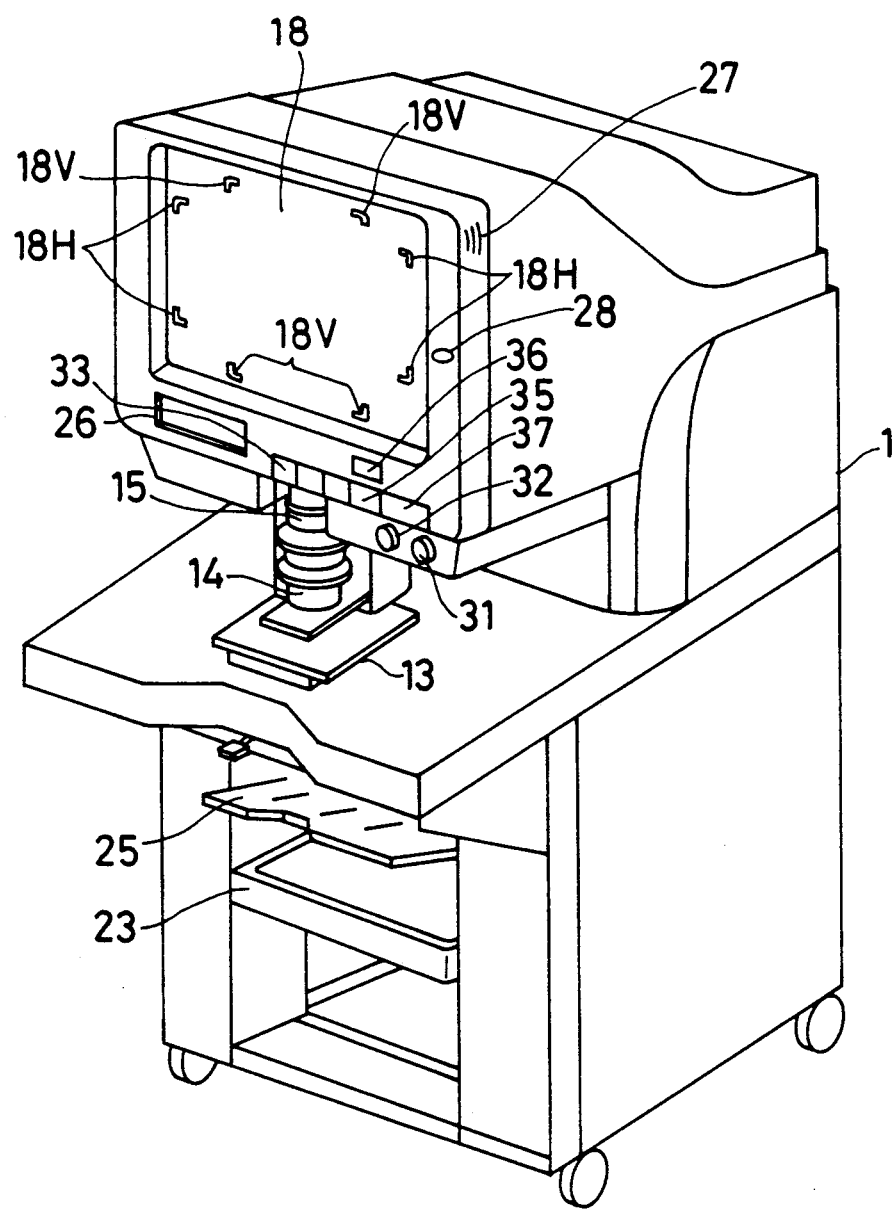
FIG. 2 is a perspective view thereof as seen obliquely from the front and above.

FIGS. 1 and 2 illustrate a microfilm reader/printer to which was applied the present invention, wherein FIG. 1 is a sectional side view thereof and FIG. 2 is a perspective view thereof as seen obliquely from the front and above. In FIGS. 1 and 2, reference numeral 1 denotes a microfilm reader/printer; numeral 11 denotes a light source; numerals 12 and 13 denote a condenser lens and a microfilm carrier, respectively; numeral 14 denotes a projection lens provided with a later-described automatic zooming mechanism; numeral 15 denotes an image rotating prism; and numeral 16 denotes a scanning mirror having not only the function of making change-over between a reader optical path and a printer optical path but also the function of scanning an image on a microfilm at the time of printing. Further, numeral 17 denotes a reflection mirror provided on the reader optical path; and numeral 18 denotes a screen, on which there are provided frame marks 18V indicating corner positions of the profile of a vertically long image, and frame marks 18H indicating corner positions of the profile of a laterally long image. The sizes of the long and short sides of images defined by the corner frame marks 18V and 18H are respectively set e in both vertically and laterally long images. Numerals 19, 20 and 21 denote reflective mirrors disposed on the printer optical path; numeral 22 denotes a photosensitive drum; numeral 23 denotes a paper feed cassette; numeral 24 denotes a sensor for detecting the size of copying paper stored in the paper feed cassette; and numeral 25 denotes a paper discharge tray. Further, numeral 26 denotes a liquid crystal display for displaying various pieces of information; and numeral 27 denotes a buzzer which is utilized for warning, etc.; and numeral 28 denotes a light emitting diode (LED) utilized for warning, etc.

As to the cassette 23 for storing copying paper, there are provided plural cassettes for various sizes of paper, and by selectively attaching these cassettes to the microfilm reader/printer, it is possible to change the size of copying paper.

The illustrated microfilm reader/printer is provided with an electrophotographic type image forming mechanism, but this mechanism itself is well known, so it is not shown in the drawings.

Figure 3:
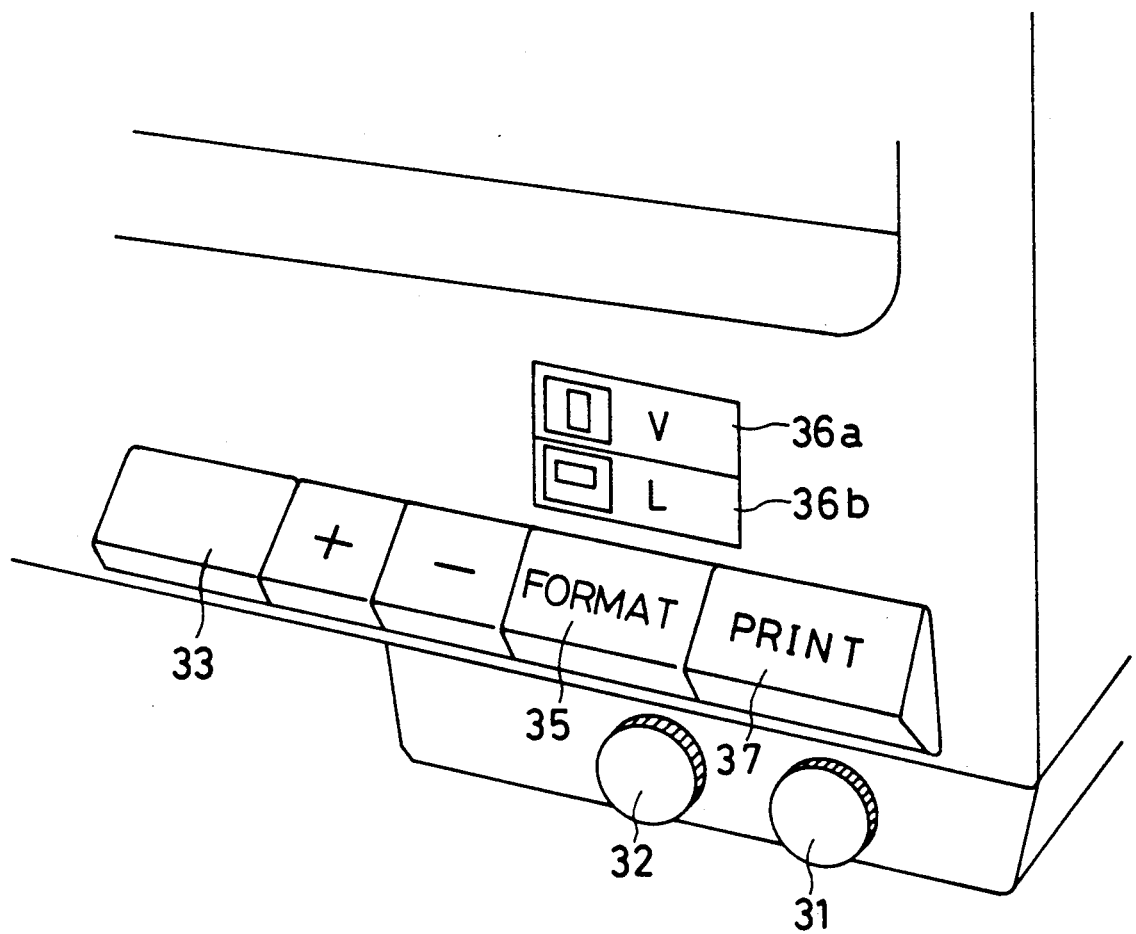
FIG. 3 is a partial, enlarged, perspective view of an operation panel.

FIG. 3 is an enlarged perspective view of an operation panel portion of the microfilm reader/printer 1. In the same figure, numeral 31 denotes a zoom switch for manually adjusting the magnification (zoom ratio) of the projection lens 14. While the zoom switch 31 is ON, a later-described pulse motor 45 is driven and the magnification changes in a continuous manner. Numeral 32 denotes a switch for manually rotating the image rotating prism 15; and numeral 33 denotes an auto zoom cancel/resume key for cancelling the auto zoom processing when the image projected onto the screen is to be copied at the same magnification and also for resuming the same processing. Numeral 35 denotes a format change-over switch which inputs information indicating whether an image is vertically long or laterally long. In accordance with the input information, whether the image is vertically long or laterally long is indicated by a format indicating LED 36a or 36b. Numeral 37 denotes a print key. Upon turning ON of the print key 37, a mode is changed from a reader mode to a print mode, and printing operation is started.

The operation of the microfilm reader/printer having the above construction will now be outlined. Upon application of electric power, the reader mode is selected and the position of the scanning mirror 16 changes over to its reader optical path position. Light emitted from the light source 11 is converged by the condenser lens 12 and radiated to a microfilm placed on the microfilm carrier 13. An image on the film is enlarged and projected onto the screen 18 through the projection lens 14, image rotating prism 15, scanning mirror 16 and mirror 17, and is seen.

For preparing a print, first, the zoom switch 31 is turned ON and the magnification of the projection lens 14 is adjusted so that the profile of the image projected on the screen 18 comes into conformity with the frame marks 18V or 18H on the screen. Further, the format change-over switch 35 is operated according to whether the image projected on the screen is vertically long or laterally long, and the state of indication of the format indicating LED 36a or 36b is conformed to the shape of the image on the screen, whereby information indicating whether the image is vertically long or laterally long is inputted. Subsequently, whether or not the image is to be rotated is determined in accordance with the direction of copying paper relative to the copying paper feed direction. When the print key 37 is pushed to change over the operation mode to the print mode, the position of the scanning mirror 16 is changed over to its printer optical path position. A microfilm image irradiated by the light source 11 is projected onto the photosensitive drum 22 through the projection lens 14, image rotating prism 15, scanning mirror 16 and reflective mirrors 19, 20, 21 to form a latent image. The thus formed latent image is recorded as a developed image on copying paper by a known electrophotographic type image processing method.

At this time, if it is indicated by the operation of the format change-over switch 35 that the image is not to be rotated, the image rotating prism 15 does not rotate. Further, the magnification J of the projection lens 14 just before depression of the print key 37 is set automatically to a magnification K in printing. On the other hand, when it is indicated that the image is to be rotated, the image rotating prism 15 rotates automatically. Further, the printing magnification K of the projection lens 14 is changed to a magnification K' obtained by multiplying the magnification K by a predetermined reduction rate M so as not to cause a partial image loss based on image deviation due to the off-center rotation which occurs upon rotation of the image rotating prism 15. The magnification K' is newly set as a printing magnification. This point will be described in detail later.

Figure 4:
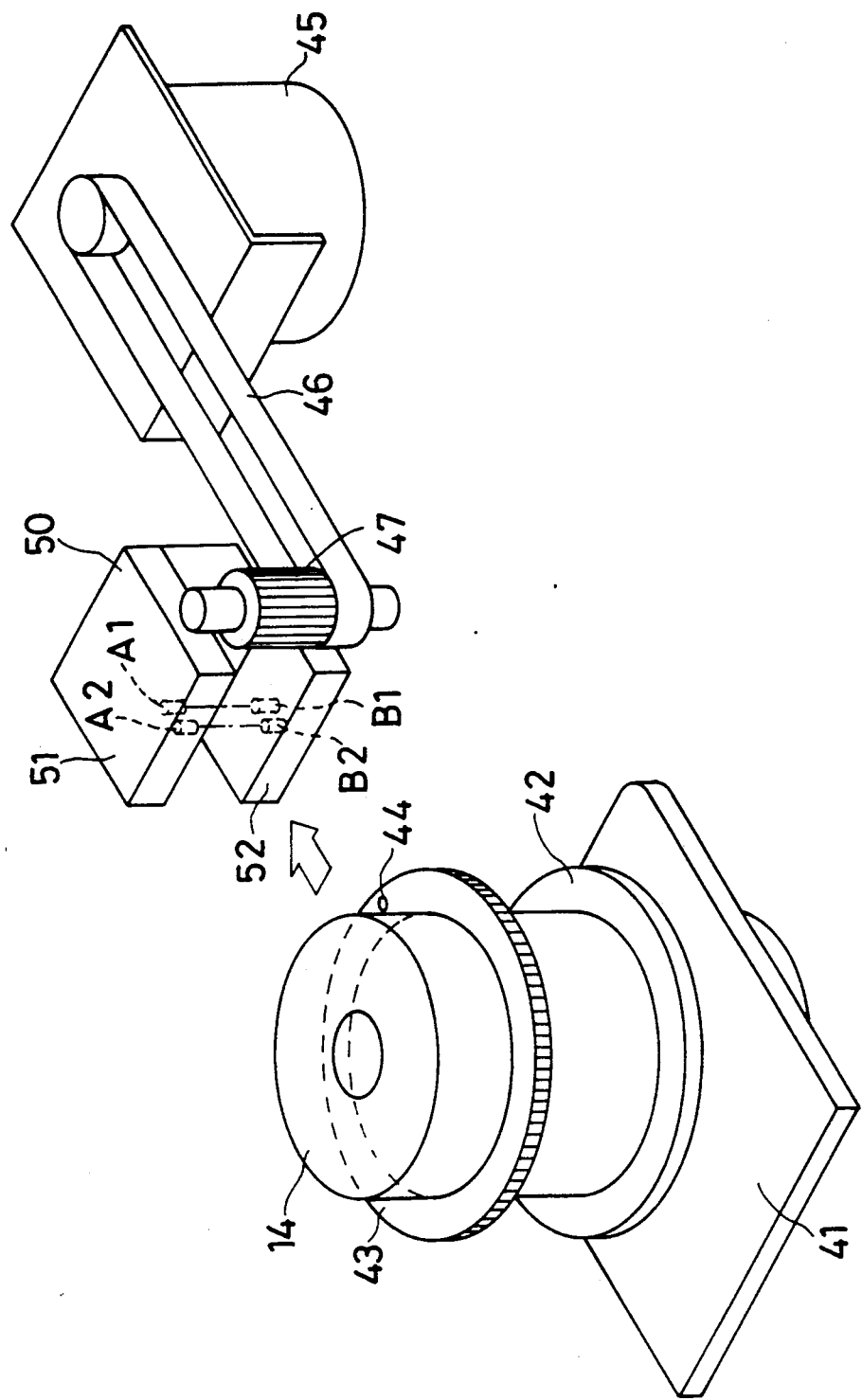
FIG. 4 is a perspective view showing a construction of a projection lens.

The construction of the projection lens provided with the auto zooming mechanism will now be described with reference to FIG. 4. The projection lens has a removable construction with respect to the microfilm reader/printer 1. On the microfilm reader/printer 1 side, there is provided a lens holder (not shown), and the projection lens is provided on a mount 41 which is inserted in the lens holder. The projection lens 14, which is a known zoom lens, is provided with a focus ring 42 for focal point adjustment which is operated manually, and a zoom gear 43 for setting a focal length (zoom ratio). The zoom gear 43 has a minimum magnification position detecting hole 44. On the other hand, on the lens holder side, there is provided a pinion 47 which is driven by a pulse motor 45 through a belt 46 and which comes into mesh with the zoom gear 43. Further, above and below the zoom gear 43, there is provided a sensor 50 for detecting the minimum magnification position detecting hole 44. The sensor 50 is composed of a light emiting portion 51 comprising two light emitting elements $A_1$, $A_2$ and a light sensing portion 52 comprising two light sensing elements $B_1$, $B_2$. That the light emitting and sensing elements are provided in a set of two is for the distinction of two kinds of projection lenses. In the first lens, when the detection hole 44 provided in the zoom gear 43 is positioned between the light emitting element $A_1$ and the light sensing element $B_1$ and the light emitted from the light emitting element $A_1$ passes through the detection hole 44 and is detected by the light sensing element $B_1$ and the detected signal is outputted, it is judged that the lens was set to the minimum magnification. In the second lens, when the light emitted from the light emitting element $A_2$ passes through the detection hole 44 provided in the zoom gear 43 and is detected by the light sensing element $B_2$ and the detected signal is outputted, it is judged that the lens was set to the minimum magnification. It goes without saying that the position of the detection hole 44 of the zoom gear 43 in the first lens and that in the second lens are different and correspond to the positions of the respective light emitting and sensing elements.

Further, when detected signals are outputted from both light sensing elements $B_1$ and $B_2$, it is judged that the projection lens 14 is not mounted, while when neither of the light sensing elements $B_1$ and $B_2$ outputs a detected signal, it is judged that the projection lens 14 is mounted but not set to the minimum magnification.

With the above construction, using the minimum magnification position detected by the sensor 50 as a reference position, the rotational angle of the zoom gear 43, i.e., a focal length, is determined from the number of pulses fed to the pulse motor 45 and the lens can be set to a desired focal length.

In this apparatus, when control is initialized by the application of electric power, for example, the zoom gear 43 is turned to the position in which the detection hole 44 is detected by the sensor 50.

The reason why the projection lens 14 is constituted removably is that in the case of a microfilm reader/printer the range of focal length to be set, i.e., the zoom ratio, is large and cannot be covered by a single projection lens.

Figure 5:
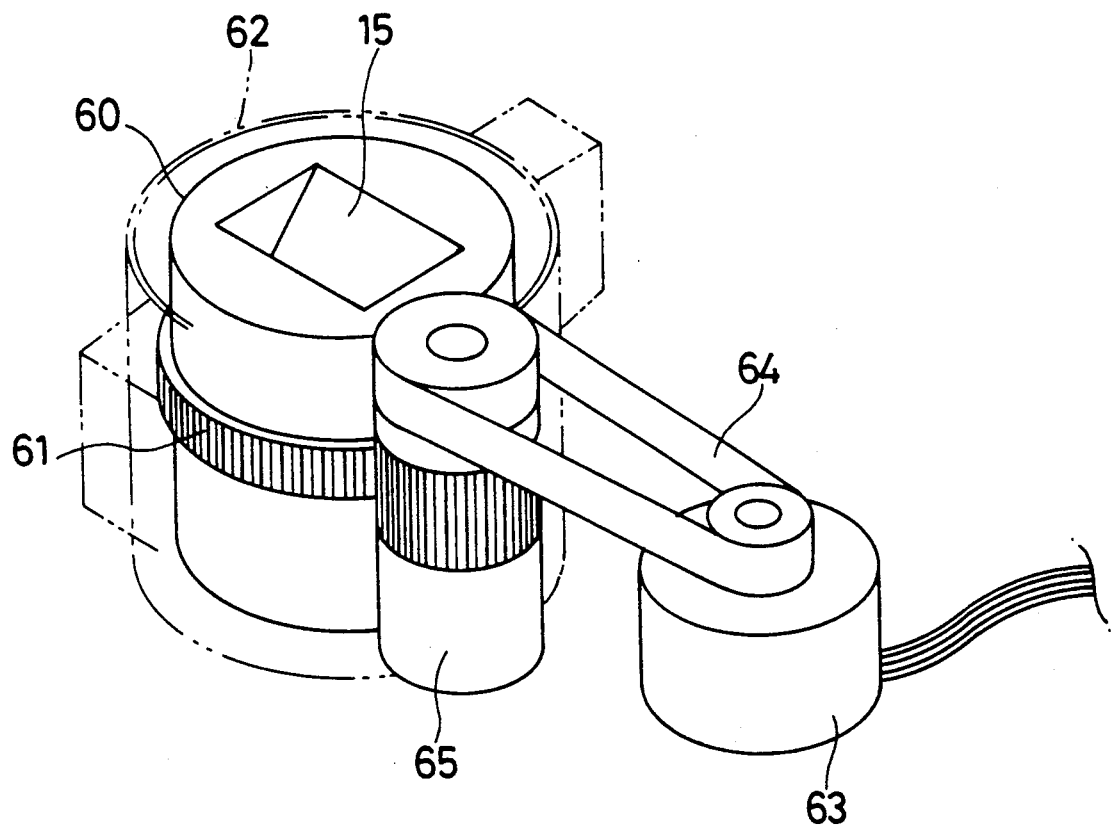
FIG. 5 is a perspective view showing a construction of an image rotating prism.

The construction of the image rotating prism 15 will now be described with reference to FIG. 5. Since the construction as an optical element of the image rotating prism is known, the explanation thereof will be omitted, and the rotating mechanism of the prism will now be explained. In the same figure, the prism 15 is mounted to a cylindrical body 60 which is provided with a gear portion 61 on a side face thereof, and it is supported rotatably within an outer cylinder 62. A portion of the outer cylinder corresponding to the gear portion 61 is cut out, and a pinion 65 which is driven by a pulse motor 63 through a belt 64 is in mesh with the gear portion 61.

With the above construction, when a desired number of pulses are fed to the pulse motor 63, the image rotating prism 15 rotates by an angle corresponding to the number of pulses fed, whereby the microfilm image can be rotated by a desired angle, e.g., 90°.

Figure 6:
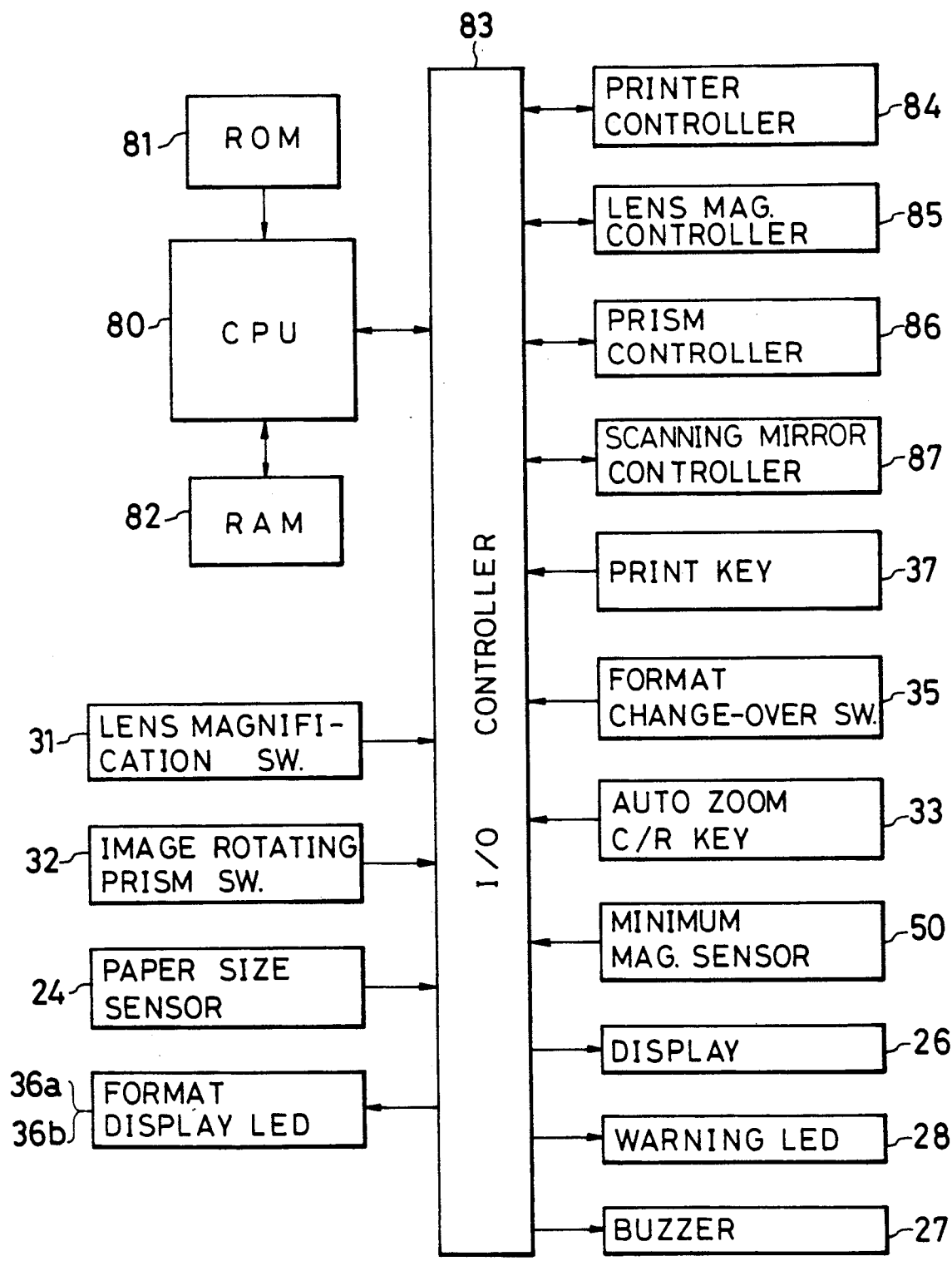
FIG. 6 is a block diagram of a control circuit of the microfilm reader/printers.

FIG. 6 is a block diagram of a control circuit of the microfilm reader/printer. The control circuit comprises a CPU 80, ROM 81, ROM 82 and printer controller 84, projection lens magnification controller 85, image rotating prism controller 86. scanning mirror controller 87, print key 37, format change-over switch 35, auto zoom cancel/resume key 33, projection lens minimum magnification sensor 50, projection lens magnification switch 31, image rotating prism switch 32, copying paper size sensor 24, liquid crystal display 26, buzzer 27, warning LED 28, and format display LEDs 36a, 36b through an I/O controller 83.

The printer controller 84 controls a mechanism for performing a series of electrophotographic image processings to develop a latent image of a microfilm image projected onto the photosensitive drum 22, using toner, and recording the developed image on the copying paper. The projection lens magnification controller 85 drives the pulse motor 45 to rotate the zoom gear 43 in accordance with a signal input from the projection lens magnification setting switch 31 on the operation panel or magnification data obtained as a result of magnification calculation executed in the CPU 80, thereby setting the magnification of the projection lens 14 to a desired magnification. The image rotating prism controller 86 drives the pulse motor 63 to rotate the gear portion 61 of the cylindrical body 60 for the prism, thereby rotating the image rotating prism 15 by a predetermined angle and returning it to its initial position in accordance with a signal input from the prism rotating switch 32 or a signal input from the format change-over switch 35 and the result of judgment as to whether the image should be rotated or not which judgment is executed in the CPU 80 on the basis of the vertical and lateral positions of the image and the copying paper feed direction.

The scanning mirror controller 87 controls driving of the scanning mirror 16 to make change-over of the mirror between the reader optical path and the printer optical path and make scanning of the image surface at the time of printing.

The following description is now provided about a first embodiment of an automatic projection magnification changing processing which is one of characteristic features of the present invention. The automatic projection magnification changing processing indicates a processing for automatically changing the projection magnification according to the size of copying paper selected at the time of preparing a print of image which is projected onto a screen in an enlarged state to a predetermined size (A4 size in this embodiment). This processing will hereinafter be referred to as the "auto zoom processing".

Through this processing, merely by selecting the size of copying paper, it is possible to obtain an enlarged print according to the copying paper size without manually inputting a projective magnification by a key, etc. at the time of printing.

Figure 7A:
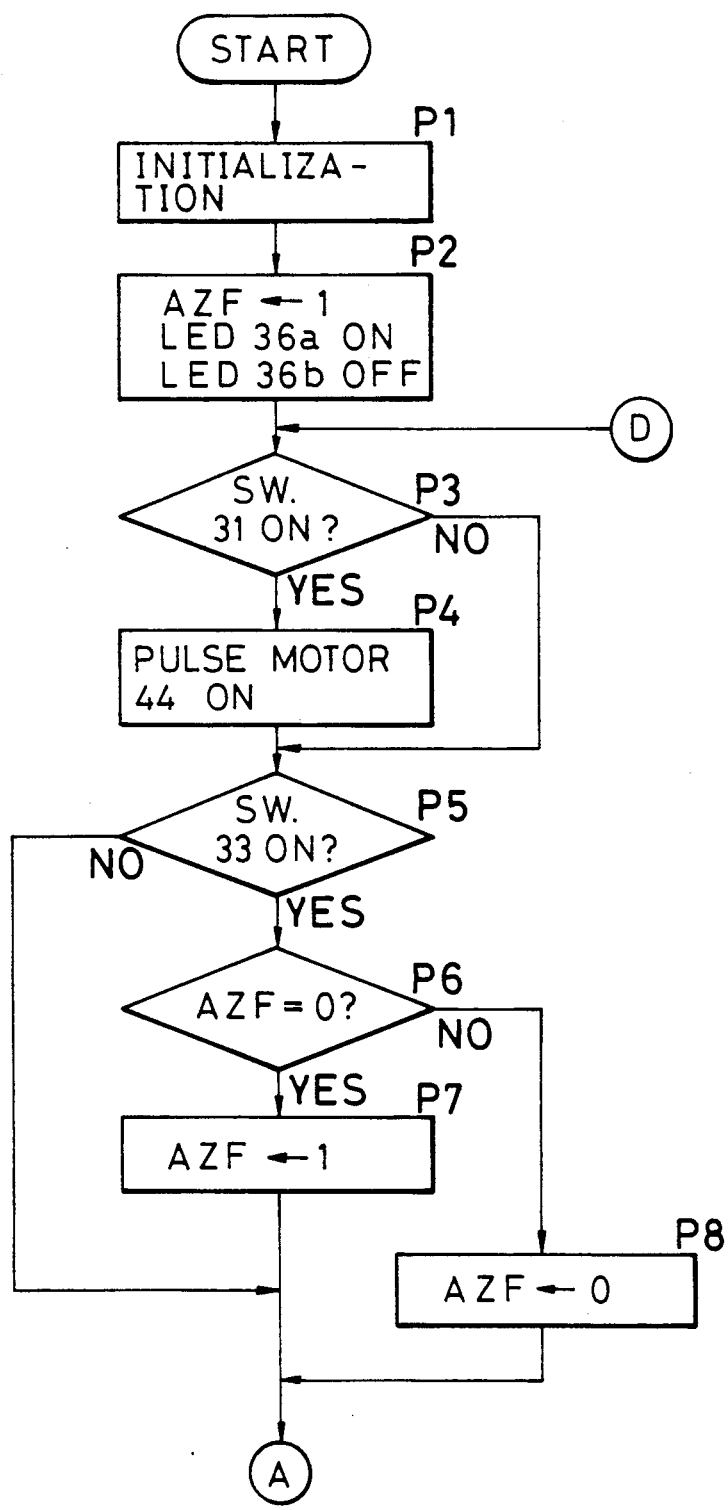
FIGS. 7(a) 7(b) and 7(c) are flowcharts for explaining a first embodiment of an automatic projection size changing processing which is executed by a central processing unit (CPU)
Figure 7:
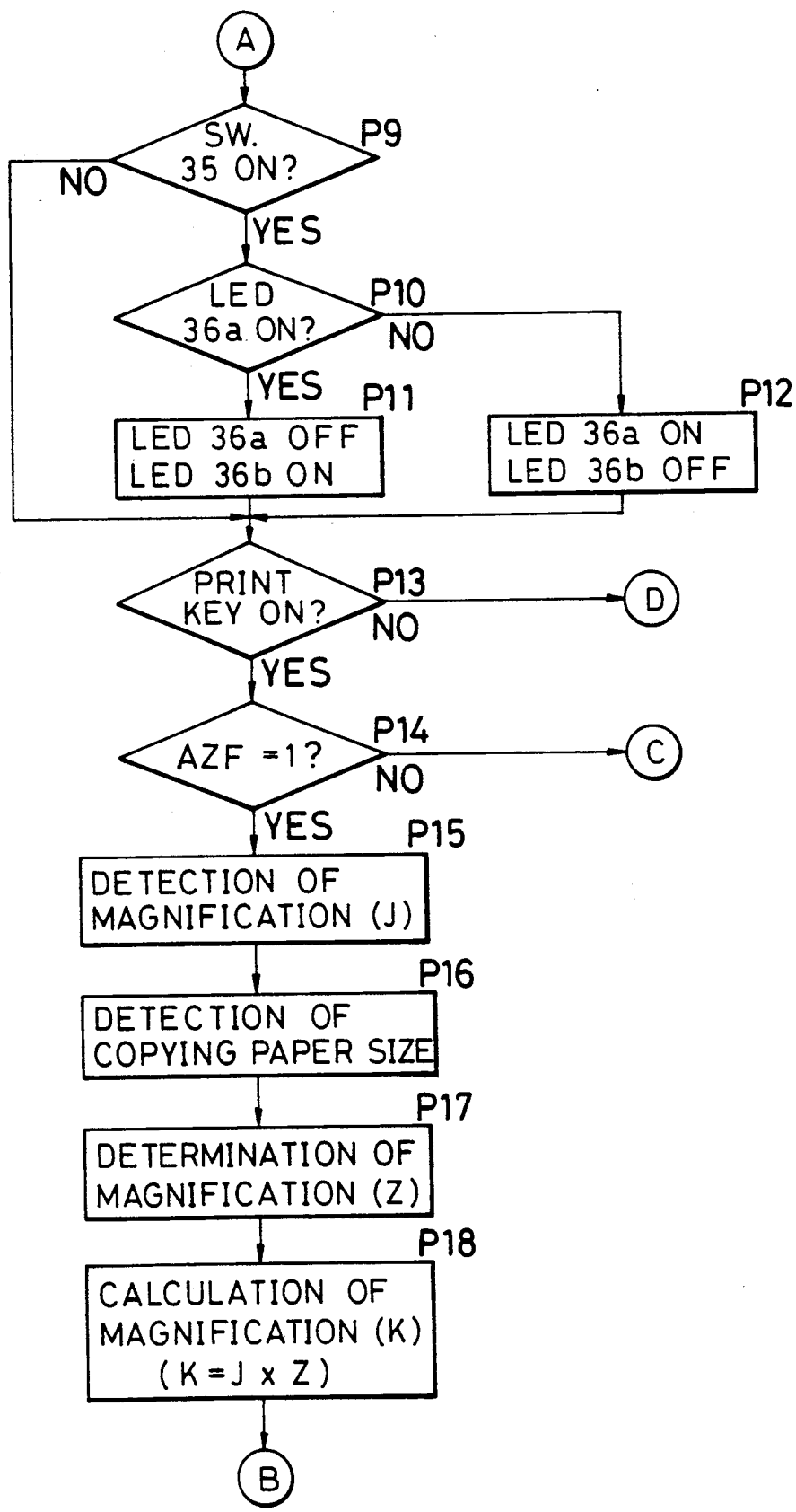
Figure 7C:
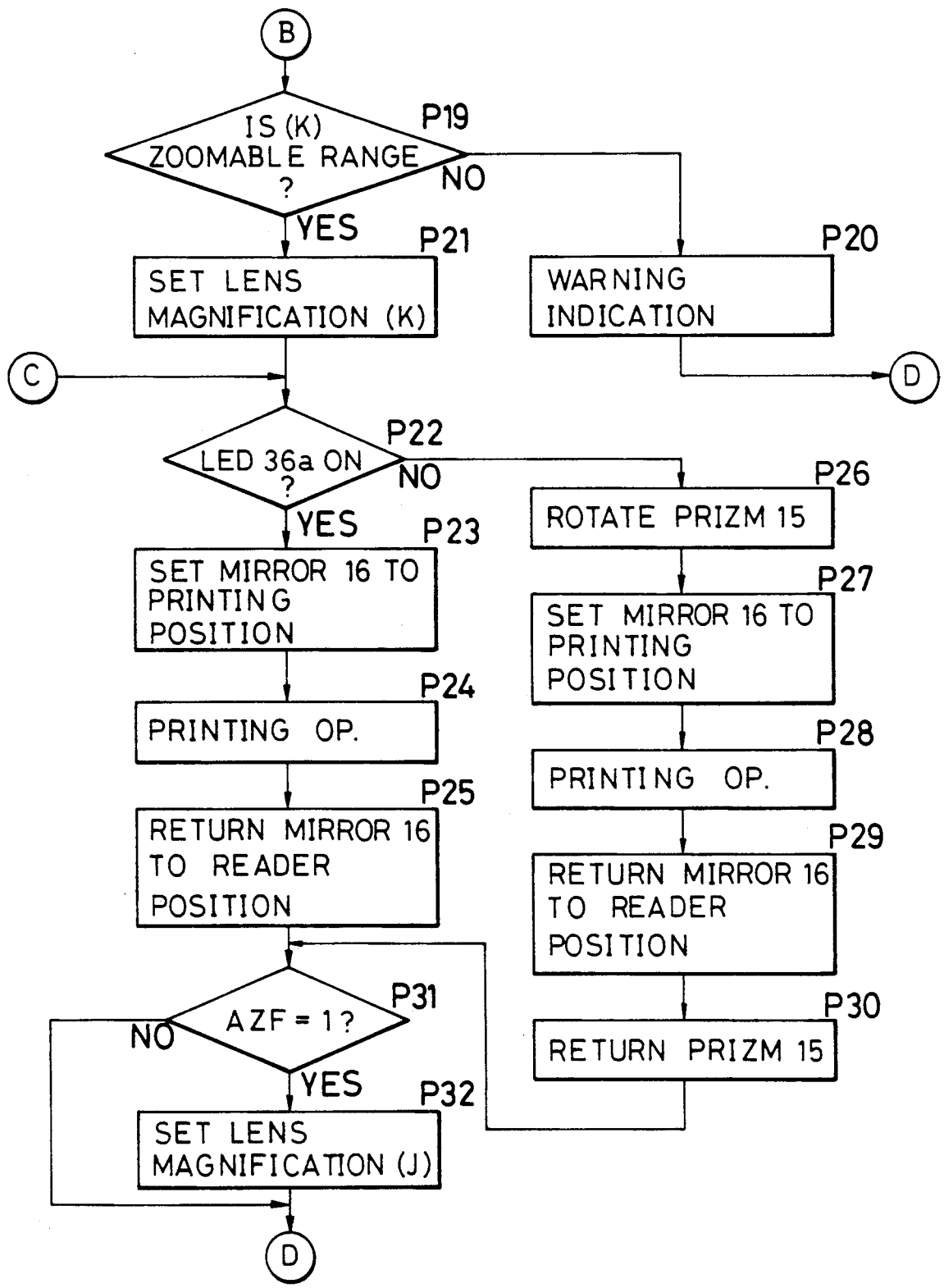

FIGS. 7(a), 7(b) and 7(c) are flowcharts showing the first embodiment of the auto zoom processing mentioned above which is executed by the CPU 80 in the control circuit.

Upon application of electric power, the control operation of the CPU 80 is started. First, those to be controlled are initialized, such as initialization of flag and memory in the CPU 80 and setting of various movable mechanisms to respective initial positions (step P1). For initialization, a flag AZF which indicates the execution of the auto zoom processing is set at "1", and the format indicating LED 36a indicating that the image projected on the screen is vertically long is turned ON, while the LED 36b is turned OFF (step P2). When the flag AZF is "1", this state indicates that the auto zoom processing is executed, while when it is "0", this state indicates that the auto zoom processing is not executed. Then, the CPU 80 judges whether or not the zoom switch 31 for manually adjusting the magnification of the projection lens has been turned ON (step P3), and if the answer is affirmative, the CPU drives the pulse motor 45 while the switch 31 is ON (step P4). Through this operation, the operator can conform the profile of the microfilm image projected on the screen to the frame mark 18H or 18V on the screen. On the other hand, if it is judged in step P3 that the zoom switch 31 is not ON, the flow proceeds to step P5. In step P5, the CPU 80 judges whether or not the auto zoom cancel/resume key 33 has been turned ON (step P5), and if the answer is affirmative, the CPU judges whether or not the flag AZF is "0" (step P6). If the answer is affirmative, the CPU 80 sets the flag AZF at "1", while if the flag AZF is "1", the CPU set this flag at "0" (steps P7 and P8). Then, the CPU 80 judges whether or not the format change-over switch 35 has been turned ON (step P9), and if the answer is affirmative, the CPU checks the state of the format indicating LED 36a (step P10), and if the LED 36a is ON (vertical), the CPU turns the LED 36a OFF and the LED 36b ON. Conversely, if the LED 36a is OFF (lateral), the CPU turns the LED 36a ON and LED 36b OFF (steps P11 and P12).

Then, the CPU 80 judges whether or not the print key 37 has been turned ON (step P13), and if the answer is negative, the flow returns to step P3, while if the print key 37 has been turned ON, the CPU checks whether or not the flag AZF is "1" (step P14). If the flag AZF is "1", the CPU detects the present projective magnification J of the projection lens 14 (step P15). In this case, as previously noted, an angular position defined by the rotation with the pulse motor 45, i.e., the number of pulses fed to the pulse motor 45, is stored in the memory, using as a reference position the minimum magnification position in which the detection hole formed in the zoom gear 43 of the projection lens 14 is detected by the sensor 50, so the projective magnification J can be detected by reading the number of pulses.

Next, the copying paper size is detected by the copying paper size sensor 24 (step P16), and a magnification Z for expansion (reduction) to the copying paper size from the size of the frame marks 18H, 18V (both A4 size in this embodiment) on the screen 18 is determined with reference to a table contained in the memory (step P17). If the detected size of the copying paper is A4 size, the magnification Z for expansion (reduction) is equal to 1.0.

On the basis of the magnification J for projection onto the screen and the magnification Z for expansion (reduction) to the detected copying paper size, there is calculated the magnification K ($=J\times Z$) for enlarged projection from the microfilm onto the selected copying paper (step P18).

Then, the CPU 80 judges whether or not the calculated magnification K is within the zoomable magnification ran9e of the pro]ection lens 14 (step P19), and if the answer is negative, the CPU makes a warning indication such as lighting of the warning LED 28 or sounding of the buzzer 27 (step P20), and then returns to step P3. In this case, an error display may be made on the liquid crystal display 26, for example, "Auto Zoom Impossible," "Change Magnification", or "Change Copying Paper Size".

If it is judged in step P19 that the calculated magnification K is within the zoomable magnification range, the pulse motor 45 is driven in accordance with the magnification K to set the magnification of the projection lens 14 at a desired projective magnification (step P21). In order to make the longitudinal direction of the image projected on the screen 18 coincident with the lonqitudinal direction of the copying paper, the CPU 80 judges whether or not the format indicating LED 36a is ON (step P22). If the LED 36a is ON, it follows that the longitudinal direction of the image projected and that of the copying paper are coincident with each other. So it is not necessary to rotate the image rotating prism 15, and hence the printing operation is started immediately. More specifically, the scanning mirror 16 is changed over to its printer optical path position for the execution of a predetermined printing operation, and thereafter the scanning mirror 16 is again returned to its reader optical path position (steps P23, P24 and P25). On the other hand, if the LED 36a is not ON, it follows that the longitudinal direction of the projected image and that of the copying paper are not coincident with each other. So a predetermined number of pulses are fed to the pulse motor 63 to turn the image rotating prism 15 by 45° (step P26), whereby the projected image turns by 90° and the longitudinal direction of the projected image and that of the copying paper come into coincidence with each other. Then, the scanning mirror 16 is changed over to its printer optical path position, and after the execution of a predetermined printing operation, the scanning mirror 16 is again returned to the reader optical path position and the image rotating prism 15 is returned to its home position (steps P27, P28, P29 and P30). Then, the flow shifts to step P31, in which the CPU 80 judges whether or not the flag AZF is "1". If the flag AZF is "1", it follows that the magnification of the projection lens 14 is set at K. So the magnification is returned to the magnification J in the reader mode (step P32) and the flow returns to step P3.

Actually, change of the magnification of the projection lens 14, change-over of the scanning mirror 16 between the reader optical path and the printer optical path, and change of the direction of projected image by the rotation of the image rotating prism 15, are performed simultaneously.

Now, a second embodiment of the auto zoom processing will be described. According to the second embodiment, when the direction of a projected image is changed by rotating the image rotating prism, there is a fear of a printed image being partially broken off due to off-center rotation, so in this case, the projective magnification in printing is set using a projection magnification K' obtained by multiplying a calculated projection magnification by a predetermined reduction ratio M.

Figure 8:
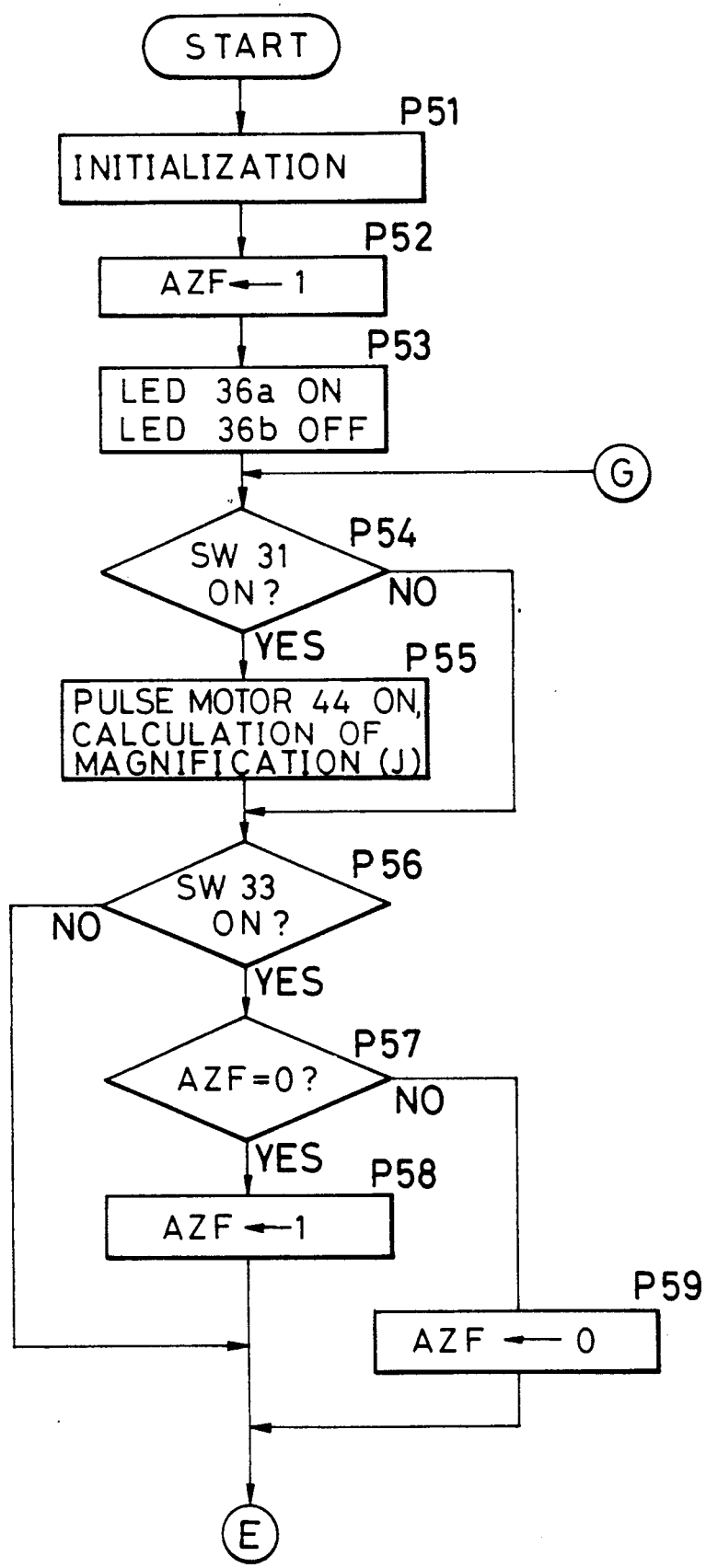
FIGS. 8(a), 8(b) and 8(c) are flowcharts for explaining a second embodiment of an automatic projection size changing processing executed by a CPU.
Figure 8:
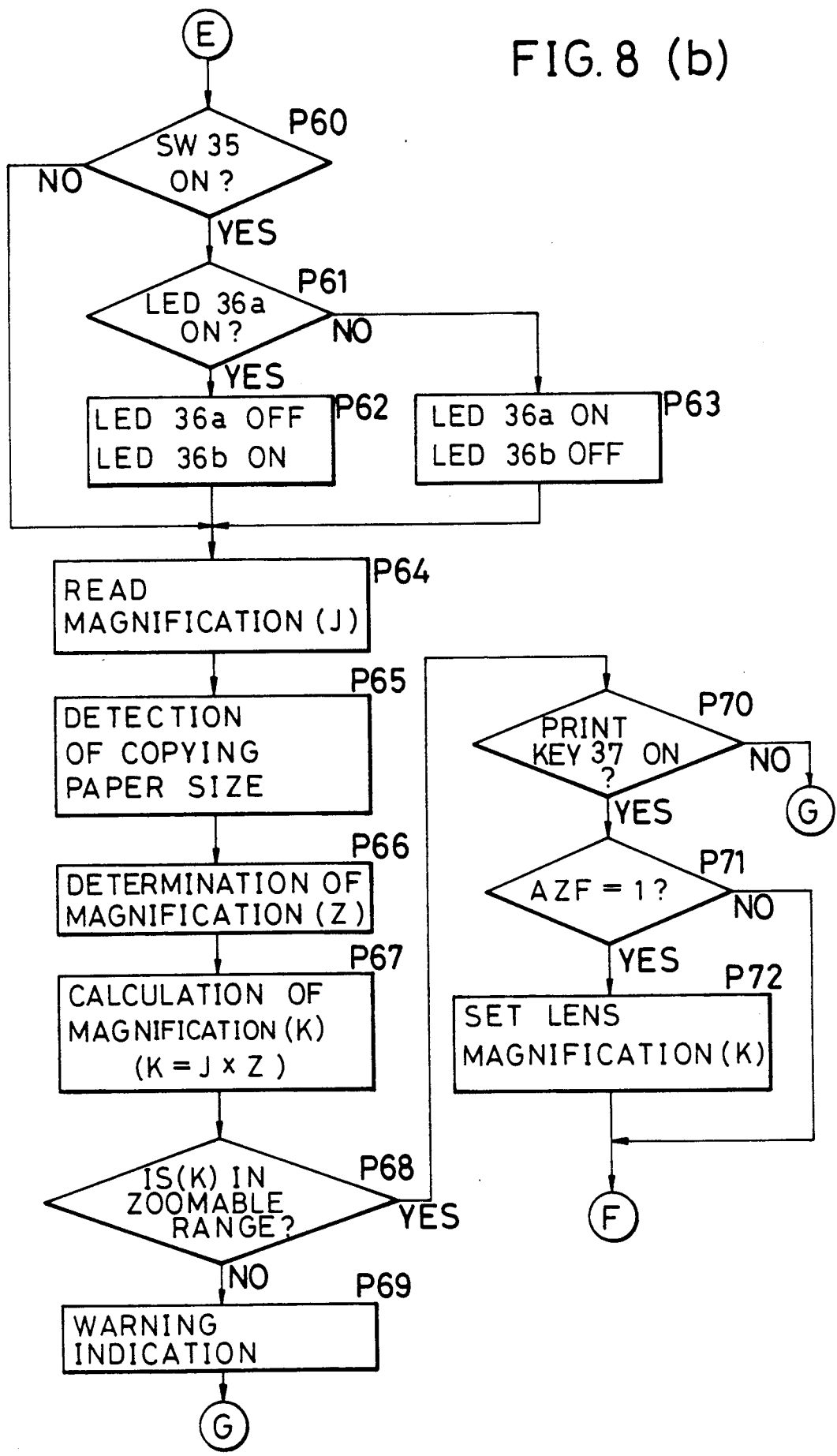
Figure 8:
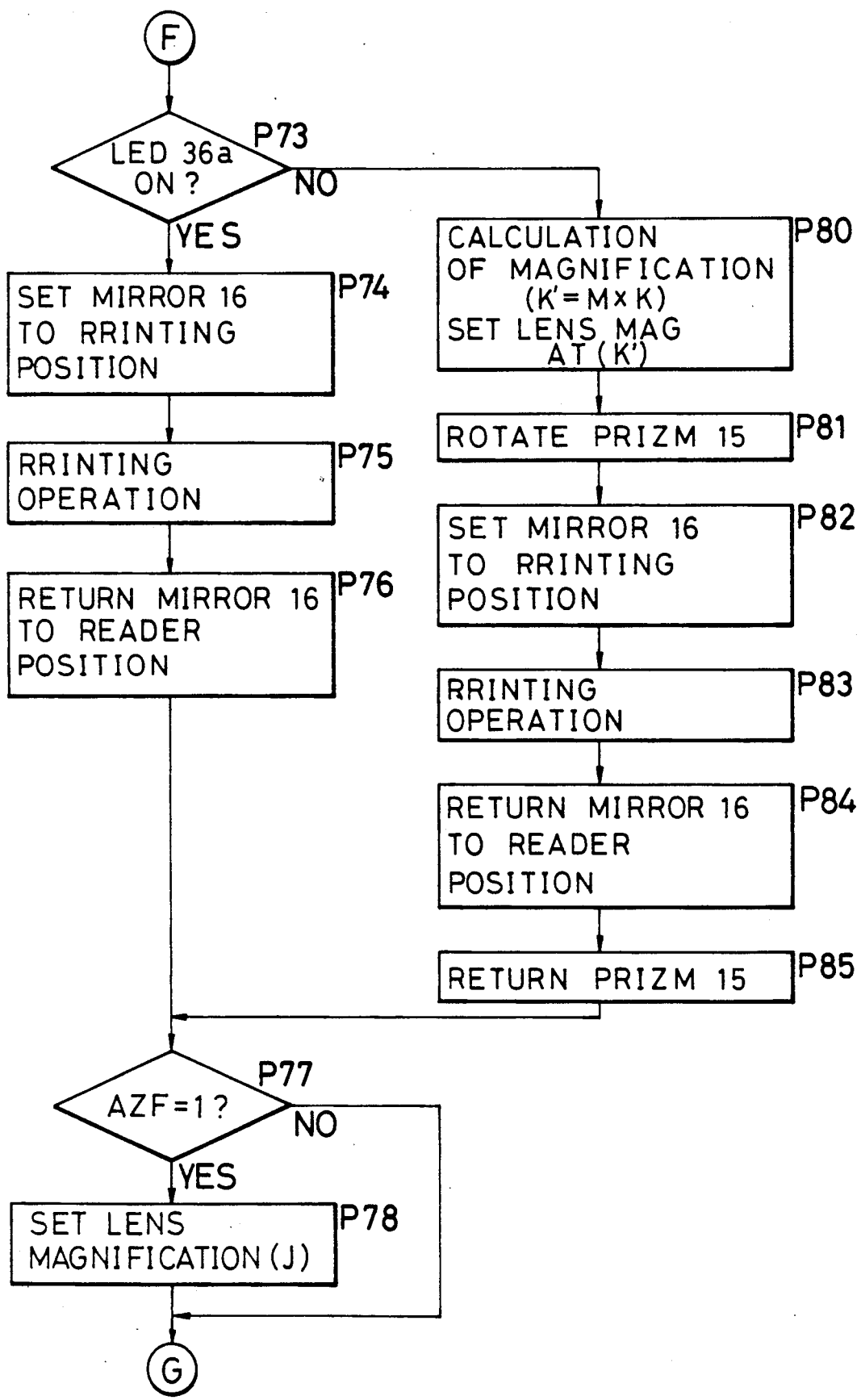

FIGS. 8(a) to 8(c) are flowcharts for explaining control operations in the second embodiment executed by the CPU 80 in the control circuit.

Upon application of power and start-up of operation, the CPU 80 initializes the RAM (step P51) and sets the auto zoom flag AZF at "1" (step P52). As conditions for the initialization, the format indicating LED 36a is turned ON and the LED 36b is turned OFF (step P53). Then, the CPU 80 judges whether or not the zoom switch 31 has been turned ON (step P54). If the answer is affirmative, the pulse motor 45 is driven to change the magnification of the projection lens 14. Though the details are omitted, the pulse motor 45 continues to be driven while the operator keeps the zoom switch 31 ON, and the magnification varying processing is completed by turning the zoom switch 31 OFF. The rotating direction of the pulse motor 45 is reversed between the case where the zoom switch 31 is turned clockwise and the case where it is turned counterclockwise. Setting is made so that when the zoom switch 31 is turned ON clockwise, the magnification of the projection lens 14 becomes larger, while when it is turned ON counterclockwise, the magnification becomes smaller. At this time, the number of pulses fed to the pulse motor 45 is counted and the magnification J of the projection lens 14 is calculated according to the counted value (step P55). When the zoom switch 31 is not ON, the execution of step P55 is omitted.

The number of pulses fed to the pulse motor 45 indicates displacement of the projection lens from the reference position detected by the minimum magnification position sensor 50 for the projection lens. The calculated magnification J is stored in the memory and later used in magnification changing calculation.

Then, the CPU 80 judges whether or not the auto zoom cancel/resume key 33 has been turned ON (step P56), and if the answer is affirmative, the CPU 80 judges whether or not the flag AZF is "0" (step P57). If the flag AZF is "0", the CPU sets the flag AZF at "1", while if it is "1", the CPU sets it at "0" (steps P58 and P59). If it is judged in step P56 that the auto zoom cancel/resume key 33 is not ON, the execution of steps P57 to P59 is omitted.

The flow shifts to step P60, in which the CPU 80 judges whether or not the format change-over switch 35 has been turned ON, namely, whether or not change-over has been commanded (step P60). If the answer is affirmative, the CPU judges whether or not the format indicating LED 36a is ON (step P61). If the LED 36a is ON, the CPU turns the LED 36a OFF and LED 36b ON, while if the LED 36a is OFF, the CPU turns the LED 36a ON and LED 36b OFF (step P62 and P63). If it is judged in step P10 that the format change-over switch 35 is not ON, it follows that there is no change-over command, so the execution of steps P61 to P63 is omitted.

Then, the CPU 80 reads out the set magnification J of the projection lens 14 from the memory (step P64). The size of the copying paper stored in the selected feed cassette 23 is detected by the sensor 24 (step P65), and the magnification Z for expansion (reduction) to the copying paper size from the size of the frame marks 18H, 18V on the screen is determined (step P66). This can be determined from a table provided in the memory because both of the hook frame size and the copying paper size are predetermined.

Then, the CPU 80 calculates the projection lens magnification $K = J \times Z$ which is necessary for the printing operation (step P67) and judges whether or not the calculated magnification is within the zoomabl magnification range capable of the projection lens to be used (step P68). If it is in an unsettable magnification range, a zoom impossible indication is made by the warning LED 28, etc. (step P69), and the flow returns to step P54. In this connection, where the LED 36a is OFF, it may be also detected whether or not a later-described magnification $K' = K \times M$ is outside the magnification range capable of being set in the projection lens to be used, followed by a zoom impossible indication. On the other hand, if the calculated magnification is within a settable magnification range, the CPU 80 judges whether or not the print key 37 is ON (step P70), and if the answer is negative, the flow returns to step P54. On the other hand, if the print key 37 is ON, the CPU judges whether or not the flag AZF is "1", namely, whether or not the auto zoom processing is selected (step P71). If AZF=1, the magnification of the projection lens 14 is set to the previously calculated magnification K. This is controlled in accordance with the number of pulses fed to the pulse motor 45. If it is judged in step P71 that AZF is not equal to 1, namely, if the auto zoom processing is not selected, the magnification J of the projection lens remains as it is. In this case, the image projected onto the screen 18 is printed at an equal magnification irrespective of the copying paper size.

The flow shifts to step P73, in which the CPU 80 judges whether or not the format indicating LED 36a is ON (vertical). In the case of vertical indication, since it is not necessary to rotate the image, the scanning mirror 16 is immediately changed over to its printer optical path position (step P74), the printing operation is executed (step P75), and the mirror 16 is returned to its reader optical path position (step P76). If it is judged in step P73 that the format indicating LED 36b is ON, the flow proceeds to steps P80 et seq. because it is necessary to rotate the image. First, the previously calculated magnification K of the projection lens is multiplied by the predetermined reduction rate M to obtain the projection lens magnification $K'$ ($= M \times K$), and the magnification of the lens is set at the magnification K' (step P80). The image rotating prism 15 is turned by 45° (step P81), the scanning mirror 16 is changed over to its printer optical path position (step P82), the printing operation is executed (step P83), then the mirror 16 is returned to its reader optical path position (step P84), and the image rotating prism 15 is returned to its home position (step P85).

Thereafter, the CPU 80 judges whether or not the flag AZF is "1" (step P77). If AZF=1, namely, when the magnification of the projection lens 14 has been changed to K or K' in printing, the CPU restores the magnification to the magnification J in the screen projection (step P78), and the flow returns to step P54. On the other hand, if it is judged in step P77 that the flag AZF is not equal to 1, the flow immediately returns to step P54 because the magnification of the pro3ection lens 14 is still J which is the magnification in the screen projection, followed by the next processing.

Although in the above embodiment the printing operation is not performed unless the magnification K is within the zoomable magnification range, even in this case, there may be set a maximum or minimum zoomable magnification instead of the magnification K, allowing the printing operation to be performed. The judgment as to whether or not the magnification K is within the zoomable magnification range may be made after judging whether the projected image on the screen is vertically long or laterally long, and in the case of a laterally long image, judgment may be made with respect to the magnification K' obtained by multiplying the magnification K by the predetermined reduction rate M.

According to another printing method, the auto zoom processing is cancelled by the auto zoom cancel/resume key 33 and printing is performed at a desired magnification using the zoom switch 31.

When a laterally long image is formed, there may be inserted a lens in the projective optical path to change the magnification to K'.

Although in each of the above embodiments the present invention was applied to a microfilm reader/printer having the auto zoom processing function, the present invention is not limited thereto, but is also applicable to a microfilm reader/printer not having the auto zoom processing function.

According to the present invention, as set forth above, the image size defining marks on the screen are set equal in size for both vertically long and laterally long images, so even in the case where a zoom lens is used, once the projective magnification is set so that a microfilm image coincides with the marks, a further change of the projective magnification is not necessary no matter whether the image projected on the screen is vertically long or laterally long. And in copying, the projective magnification of a lens is changed automatically according to the copying paper size, so it is possible to effect copying at an appropriate magnification. Moreover, when the lonqitudinal direction of the image projected on the screen and that of copying paper are not coincident with each other, both can be made coincident with each other by the image rotating means disposed in the projective optical system. Further, when the image rotating means operates, in comparison with the case where it does not operate, the projective magnification is reduced at a predetermined reduction rate, so there is no fear of a copy image being partially broken off.

What is claimed is:

1. A microfilm reader/printer including:

a screen onto which an image on a microfilm is projected;

an image forming means for reproducing the microfilm image on a recording medium;

a projection means for projecting the microfilm image onto said screen and said image forming means at a desired magnification;

a projective magnification changing means for changing the projective magnification used in said projection means into a second magnification which is smaller by a predetermined ratio than the desired projective magnification;

an image rotating means for rotating the projected image by a predetermined angle;

an image forming operation instructing means for giving operation start instructions to said image forming means; and a control means which, in response to the instructions given by said image forming operation instructing means, operates said image rotating means to rotate the projected image by a predetermined angle, further operates said projective magnification changing means to change the projective magnification to the second magnification, and thereafter starts the operation of said image forming means.

2. A microfilm reader/printer according to claim 1, wherein said image rotating means includes a prism.

3. A microfilm reader/printer according to claim 1, wherein said projective magnification changing means has a lens capable of entering and leaving an optical path and changes the projective magnification to the second magnification by inserting said lens into the optical path.

4. A microfilm reader/printer according to claim 1, wherein said projection means has a zoom lens and a drive means for driving said zoom lens, and said projective magnification changing means changes the projective magnification to the second magnification by driving said drive means.

5. A microfilm reader/printer according to claim 1, further comprising a warning means which issues warning when it is impossible to make a change for reduction to the second magnification.

6. A microfilm reader/printer having a reader function of projecting an image on a film onto a screen and a printer function of copying an image on a film onto a recording medium through an image forming means, said microfilm reader/printer including:

a projection means having a projection lens for projecting an image on a microfilm onto the screen and the image forming means at any of plural magnifications;

an optical means having a first optical path for conducting the image projected by said projection means to the screen, a second optical path for conducting the image projected by said projection means to the image forming means, and a changeover means for changing over said first and second optical paths from one to the other;

a projective magnification changing means for changing the projective magnification used in said projection means into a second magnification which is smaller by a predetermined ratio than the projective magnification;

an image rotating means for rotating the projected image by a predetermined angle;

a mode selecting means for selectively setting a first mode for projecting the image as projected on the screen to the image forming means and a second mode for rotating the projected image by a predetermined angle and projecting the thus-rotated image to the image forming means;

an instructing means for operating said changeover means and instructing the start of operation of the image forming means and a control means which operates said projective magnification changing means in response to the instruction of said instructing means when the second mode is selected.

7. A microfilm reader/printer according to claim 6, wherein said projection means has a zoom lens and a drive means for driving said zoom lens, and said projective magnification changing means changes the projective magnification to the second magnification by driving said drive means.

8. A microfilm reader/printer according to claim 6, wherein said image rotating means includes a prism and rotates the image by rotation of said prism.

9. A microfilm reader/printer according to claim 6, wherein the screen has marks for vertically long images and marks for laterally long images, each of two kinds of marks indicating the range of a predetermined size, and wherein when the second mode is selected by said mode selecting means, an image in the range defined by said marks for laterally long images is copied on the recording medium, while when the first mode is selected, an image in the range defined by said marks for vertically long images is copied on the recording medium.

10. A microfilm reader/printer having a reader function of projecting an image on a film onto a screen and a printer function of copying an image on a film onto a recording medium through an image forming means, the disposed direction of the image being turned at the time of change-over from the reader function to the printer function, said reader/printer including:

a projection means having a projection lens for projecting an image on a microfilm onto the screen and the image forming means at any of plural magnifications;

an optical means having a first optical path for conducting the image projected by said projection means to the screen, a second optical path for conducting the image projected by said projection means to the image forming means, and a changeover means for changing over said first and second optical paths from one to the other;

an image rotating means for rotating the projected image by a predetermined angle; and a projective magnification changing means for changing the projective magnification at a predetermined reduction rate in association with a change-over operation from said first to said second optical path of said change-over means.

11. A microfilm reader/printer according to claim 10, wherein said image rotating means has a prism.

12. A microfilm reader/printer according to claim 10, wherein said projection means has a zoom lens and a drive means for driving said zoom lens, and said projective magnification changing means changes the projective magnification at a predetermined reduction rate by driving said drive means.

13. A microfilm reader/printer according to claim 10, further including a detecting means for detecting the size of the recording medium to be used, and wherein said projective magnification changing means determines a projective magnification on the basis of the result of the detection made by said detecting means, a predetermined range on the screen and the predetermined reduction rate.

14. An apparatus capable of projecting an image on an original onto a first projection surface and a second projection surface, said apparatus comprising:

a projection means for projecting the image on the original at a desired magnification;

a magnification changing means for changing the projective magnification of the image on the original;

a selection means for selecting either the first or second projection surface for the projection of the image;

an image rotating means for rotating the projected image by a predetermined angle; and a control means for making control to operate said image rotating means in association with the operation of said selection means and operate said magnification changing means to a pre-set magnification in association with the operation of said image rotating means.

15. A microfilm reader/printer including:

a screen onto which an image on a microfilm is projected and on which marks indicating the range of a predetermined size are provided;

an image forming means for reproducing the microfilm image on a recording medium;

a projection means having a projection lens capable of projecting the microfilm image at any of plural magnifications and a magnification changing means for changing the magnification of said projection lens;

an optical means having a first optical path for conducting the image projected by said projection means to the screen, a second optical path for conducting the image projected by said projection means to said image forming means, and a changeover means for changing over said first and second optical paths from one to the other;

a size detecting means for detecting the size of the recording medium;

a first control means which determines a projective magnification in image formation on the basis of the size of the recording medium and the size of a predetermined range on the screen; and a second control means which operates said magnification changing means in association with the start of operation of said change-over means to change the projective magnification of said projection lens into the projective magnification determined by said first control means.

16. A microfilm reader/printer according to claim 15, wherein said projection lens is a zoom lens.

17. A microfilm reader/printer according to claim 16, further comprising:

a judging means for judging whether or not the magnification determined by the first control means is within a magnification changeable range of said zoom lens; and a warning means which issues warning when the result of the calculation is not within the magnification changeable range in accordance with the result of the judgment made by said judging means.

18. A microfilm reader/printer according to claim 15, further comprising a selection means which instructs with which range on the screen a comparison is to be made at the time of image formation, and wherein there are plural ranges defined by said marks provided on the screen, and wherein the first control means makes comparison, at the time of the determination, with the range on the screen instructed by said selection means.

19. A microfilm reader/printer having a reader function of projecting an image on a film onto a screen and a printer function of copying an image on a film onto a recording medium through an image forming means, said reader/printer comprising:
- a projection means having a projection member capable of projecting the image on the film at a desired magnification and a magnification changing means for changing a projective magnification of the image on the film;
- a change-over means for changing over the reader function and the printer function from one to the other;
- a first instructing means for instructing a first projective magnification in the projection onto the screen;
- a second instructing means for instructing a second projective magnification in the projection to the image forming means; and
- a control means for controlling said magnification changing means in association with the change-over between the reader function and the printer function when the first and second projective magnifications instructed are different from each other.

20. A microfilm reader/printer according to claim 19, further comprising a detecting means for detecting the size of the recording medium, and wherein said second instructing means compares the result of the detection made by said detecting means with a predetermined range on the screen and instructs the second projective magnification.

21. A microfilm reader/printer according to claim 19, wherein said projection member includes a zoom lens and said magnification changing means includes a zoom lens driving means, and further comprising a projective magnification detecting means for detecting a projective magnification of said zoom lens and operates said magnification changing means in accordance with the result of the detection.

22. A microfilm reader/printer according to claim 19, further comprising a judging means for judging whether or not the second projective magnification can be attained by said projection member, and a warning means which issues warning when the answer of said judging means is negative.

23. A microfilm reader/printer having a reader function of projecting an image on a film onto a screen and a printer function of copying an image on a film onto a recording medium through an image forming means, said reader/ printer comprising:
- a projection means having a zoom lens capable of projecting the image on the film at a desired magnification and a drive means for driving said zoom lens to change the magnification of said zoom lens;
- an optical means having a first optical path for conducting the image projected by said projection means to the screen, a second optical path for conducting the image projected by said projection means to the image forming means, and a change-over means for changing over said first and second optical paths from one to the other;
- a magnification detecting means for detecting the projective magnification when said reader/printer executes the reader function;
- a recording medium detecting means for detecting the size of the recording medium;
- a magnification determining means for determining a magnification at the time of copying onto the recording medium on the basis of the ratio between a predetermined range on the screen and the size of the recording medium;
- a judging means for judging whether or not the magnification of said projection means can be changed at the time of magnification change; and
- a warning means which issues warning on the basis of the result of the judgment made by said judging means.

24. An apparatus capable of projecting an image on an original onto a first projection surface and a second projection surface, said apparatus comprising:
- a projection means having a projection member capable of projecting the image on the original at a desired magnification and a magnification changing means for changing a projective magnification of the image on the original;
- a selection means for selecting either the first or second projection surface for the projection of the image;
- a first instructing means for instructing a first projective magnification in the projection of the image onto the first projection surface;
- a second instructing means for instructing a second projective magnification in the projection of the image onto the second projection surface; and
- a control means for controlling said magnification changing means in association with the operation of said selection means when the first and second projective magnifications instructed are different from each other.

25. A microfilm reader/printer having a reader function of projecting an image on a film onto a screen and a printer function of copying an image on a film onto a recording medium through an image forming means, said reader/printer comprising:
- a projection means having a projection lens for projecting the image on the microfilm onto the screen and the image forming means at a desired magnification;
- an optical means having a first optical path for conducting the image projected by said projection means to the screen, a second optical path for conducting the image projected by said projection means to the image forming means, and a change-over means for changing over said first and second optical paths from one to the other;
- an image rotating means for rotating the projected image by a predetermined angle in association with the start of operation of said change-over means;
- a detecting means for detecting the size of the recording medium used; and
- a magnification changing means which, in association with the start of operation of said change-over over means, calculates a second protective magnification by comparing the result of the detection made by said detecting means with a predetermined range on the screen and changes the projective magnification to a value obtained by multiplying the second projective magnification by a predetermined reduction rate.

26. In a microfilm reader/printer including a projection lens capable of making projection at plural magnifications and an image rotating means for rotating a projected image by a predetermined angle, said reader/printer having a reader function of projecting an image on a film onto a screen and a printer function of copying an image on a film onto a recording medium through an image forming means in response to a printing instruction, a method including the steps of:

rotating the disposed direction of the image by a predetermined angle at the time of change-over from the reader function to the printer function; and making projection of the image at a magnification different from that used in the reader function, in association with printing instructions, when the printer function is executed.

27. In a microfilm reader/printer including a projection lens capable of making projection at plural magnifications, said microfilm reader/printer having a reader function of projecting an image on a film onto a screen and a printer function of copying an image on a film onto a recording medium through an image forming means in response to printing instructions, a method including the steps of:

detecting the size of the recording medium; and determining a projective magnification in the printer function by comparing the size of a predetermined range on the screen with the size of the recording medium, in response to the printing instructions.

28. An apparatus capable of projecting an image on an original onto a first projection surface and a second projection surface, said apparatus comprising:

a projection means for projecting the image on the original at a desired magnification;

a magnification changing means for changing a projection magnification of the image on the original;

a mode selection means for selecting a first mode in which the image is projected onto the first projection surface and a second mode in which the image is projected onto the second projection surface;

an image rotating means for rotating the projected image by a predetermined angle, and a control means for controlling the operation of said image rotating means in association with the operation of said mode selection means and to further operate said magnification changing means to a preset magnification in association with the operation of said image rotating means.

29. An apparatus capable of projecting an image on an original onto a first projection surface and a second projection surface, said apparatus comprising:

a projection means having a projection member capable of projecting the image on the original at a desired magnification;

a magnification changing means for changing a projection magnification of the image on the original;

a mode selection means for selecting a first mode in which the image is projected onto the first projection surface and a second mode in which the image is projected onto the second projection surface;

a first instructing means for instructing a first projection magnification in the first mode;

a second instructing means for instructing a second projection magnification in the second mode, and a control means for controlling said magnification changing means in association with the operation of said mode selection means when the first and second projection magnifications which are instructed are different from each other.

* * * * *